United States Patent [19]

Leiber

[11] 4,286,826
[45] Sep. 1, 1981

[54] BRAKE BOOSTER FOR THE ANTI-WHEEL LOCKING OF A MOTOR VEHICLE BRAKE SYSTEM

[75] Inventor: Heinz Leiber, Leimen, Fed. Rep. of Germany

[73] Assignee: Robert Bosch GmbH, Fed. Rep. of Germany

[21] Appl. No.: 133,725

[22] Filed: Mar. 25, 1980

Related U.S. Application Data

[63] Continuation of Ser. No. 870,784, Jan. 19, 1978, abandoned.

[30] Foreign Application Priority Data

Jan. 25, 1977 [DE] Fed. Rep. of Germany ....... 2702819

[51] Int. Cl.³ .............................................. B60T 8/02
[52] U.S. Cl. .................................................. 303/114
[58] Field of Search .................. 303/114; 60/535, 550, 60/582, 547

[56] References Cited

U.S. PATENT DOCUMENTS 4,015,881 4/1977 Adachi .................................. 303/114

Primary Examiner—Douglas C. Butler
Attorney, Agent, or Firm—Edwin E. Greigg

[57] ABSTRACT

A brake booster connected to a dual circuit vehicle brake system includes a housing within which there is located a booster piston and an auxiliary piston interconnected so that the displacement of the auxiliary piston in the direction of the booster piston is communicated to the booster piston. This displacement occurs when the pressure in a reservoir, to which the auxiliary piston is exposed, falls below a predetermined level. The displacement communicated to the booster piston in turn displaces the booster piston to a predetermined position which is located relative to a brake pedal push rod so that the brake pedal push rod can execute an idle stroke.

31 Claims, 6 Drawing Figures

BRAKE BOOSTER FOR THE ANTI-WHEEL LOCKING OF A MOTOR VEHICLE BRAKE SYSTEM

CROSS-REFERENCE TO RELATED APPLICATION

This application is a continuation of application Ser. No. 870,784 filed Jan. 19, 1978, and now abandoned.

BACKGROUND OF THE INVENTION

The invention relates to a brake booster for an anti-wheel locking motor vehicle brake system, which is activated by a brake pedal, through a travel limiting spring. The brake booster is provided with a control valve that monitors both the connection between a pressure source and a booster cylinder including a booster piston associated with a brake circuit, and the connection of the booster cylinder with a discharge reservoir. The booster is integrated into a hydraulic dual circuit brake system, each of whose brake circuits is integrated or self-contained.

There are basically three categories of brake force boosters for dual circuit brakes presently known: (1) Brake force boosters with two open brake circuits; (2) brake force boosters with one closed and one open brake circuit; and (3) brake force boosters with two closed brake circuits. The first category includes exterior-force brake systems in which a shift mechanism is used to keep one or two self-contained brake circuits available should the exterior force fail. Such exterior force brake systems have the disadvantage that if a malfunction in the energy supply occurs and the hydraulic fluid reservoir is exhausted, no further braking effect can be produced.

The above-mentioned disadvantage is avoided by brake systems provided with so-called "emergency pistons" or with brake circuit shift devices which guarantee that, if the energy supply fails, an additional brake pressure can be produced via a brake circuit joined thereto.

Such brake circuits have the great advantage, when used in connection with an anti-wheel locking mechanism, because anti-wheel locking pressure modulation involves the lowest costs of the three system types. Magnetic valves or a multiple valve are required for pressure modulation and adjustment.

The brake systems of the second category provide various methods for a solution. The disadvantage of this type of system is that, if the auxiliary energy fails, the braking effect in one of the brake circuits is also lost. In addition, the same disadvantage mentioned in respect to the first category is present also, that if there is a leak in one brake circuit, the hydraulic energy supply fails.

The systems of the third category are the so-called "average pressure boosters". These systems provide that the hydraulic energy supply originates from the hydraulic circuit of the servo control (circulating principle). The disadvantage in these systems is that of a relatively high construction expense. In addition, this system type is not suitable for use in the same circuit with an anti-wheel locking protection device.

OBJECTS AND SUMMARY OF THE INVENTION

A principal object of the invention is to provide a brake force booster of the type mentioned at the outset, whose booster piston can be returned to its original rest position to lower the braking pressure, as directed by the anti-wheel locking device, through smaller pressure ranges, even during maximum brake pressure application, such as upon panic braking on a slick, icy surface, and thus allowing the full de-pressurization of the brakes.

It is another object of the invention to overcome the effects of the "free travel" or lost motion accompanying a failure of the hydraulic energy supply, which results in a low brake pressure, by providing an auxiliary piston which, upon a failure of the auxiliary energy supply, restores the booster piston to a position in which it nearly abuts the brake pedal push rod.

It is a further object of the invention to provide an auxiliary piston which can also be used for sensing the storage pressure.

It is another further object of the invention to provide a mechanism whereby the brake pedal push rod cannot be moved beyond the specific travel path described earlier, even under very high pedal forces. A novel pedal stop serves for this purpose in the instant invention.

It is a still further object of the invention to provide a brake booster according to the invention which can easily be equipped with a differential pressure indicating device between the two brake circuits. Such devices are also advantageous in intact brake circuits, if, for example, one brake circuit is poorly ventilated, or if vapor locks are formed because of thermal overloading. The novel concept of the invention provides a signaling means if both circuits are producing insufficient pressure.

It is a still further object of the invention to render the brake valve push rod free of hindrances to its movement created by the presence of some foreign body in the brake fluid which could result in the brake valve failing to apply brake pressure. A basic advantage provided by this invention is that of a device to automatically bypass the defective brake valve. There is an additional advantage in the booster of the invention for its use in a central hydraulic apparatus, because if one brake circuit fails, the brake fluid supply to the rest of the apparatus remains unaffected. It is also advantageous in that the diminished operation of the anti-wheel locking mechanism can be detected at the pedal, and in that with proper spring selection a uniform brake pressure can be obtained in both brake circuits simultaneously.

The final object of the invention is to provide the booster advantageously with a device to lengthen the travel path of the brake pedal when the auxiliary force fails.

Briefly stated, the booster includes a booster piston coupled to an auxiliary piston which cooperate to produce a displacement of the booster piston to a predetermined original or initial rest position when the pressure in a reservoir to which the auxiliary piston is exposed falls below a predetermined level. This initial rest position is located to allow the brake pedal a "free travel" or idle stroke with respect to the booster piston. In this way, the booster piston has sufficient play during the operation of the anti-wheel locking device without being hindered by the brake pedal or more specifically, by its push rod.

BRIEF DESCRIPTION OF THE DRAWINGS

Several exemplary embodiments of the brake booster of the invention are shown in the drawings and are described in greater detail in the following description, in which.

DESCRIPTION OF THE PREFERRED EMBODIMENTS

Figure 1:
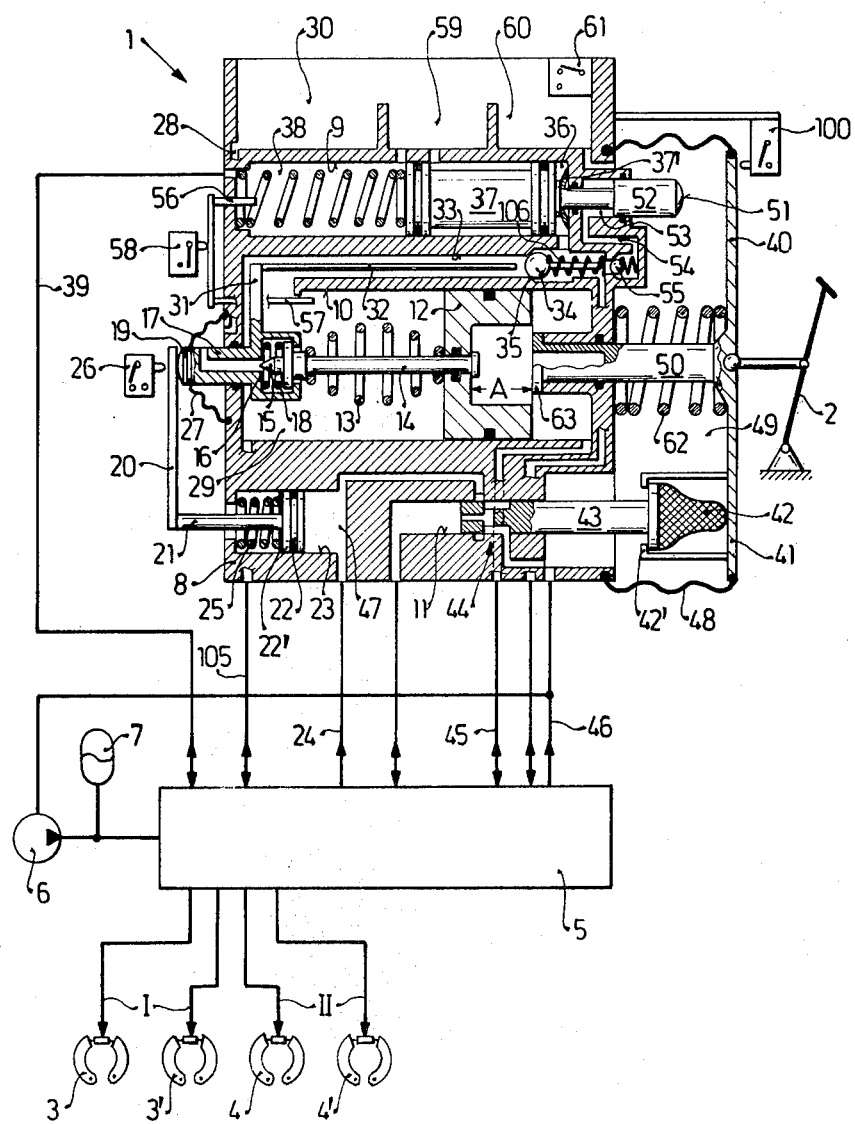
FIG. 1 illustrates a first embodiment of the brake booster in partial schematic form.

A brake booster 1 is arranged in a hydraulic brake system between a brake pedal 2 and two pairs of wheel brake cylinders 3, 3', and 4, 4'. The one pair of wheel brake cylinders 3, 3' form part of a brake circuit 1 and the other pair 4, 4' form part of a brake circuit II. Both brake circuits I and II are controlled by a multiposition control member 5 of an automatic locking protection device, to which are connected a pump 6 and a reservoir 7.

Three parallel bores 9, 10 and 11 are arranged in a housing 8 of the brake booster 1, of which the largest diameter bore 10 houses booster piston 12. A piston rod 14, which is coupled with the booster piston 12 by means of a biasing spring 13, is formed at its free end as a closing body 15 for a valve 15/16, whose seat 16 is provided in an axially movable sleeve 17. The valve 15/16 is normally held open by a spring 18.

One end 19 of the sleeve 17 projects outwardly from the booster 1 and abuts an arm 20, which is rigidly connected with a piston rod 21 of an auxiliary piston 22. The auxiliary piston 22 is arranged in a bore 23, which lies along the same axis as does the bore 11. The front side of the piston 22 is subjected to a reservoir pressure of the reservoir 47 by means of a line 24, and its rear side is subjected to the force of a reservoir spring 25, which surrounds the piston rod 21.

A reservoir pressure sensor 26 is provided opposite the end 19 of the sleeve 17, although the arm 20 is interposed therebetween, so that the auxiliary piston 22 can be used for detecting the reservoir pressure. The end 19 is sealed by a bellows connection 27. The hollow space defined by the bellows connection 27 is connected to a refill container 30 by a channel 28 and produces thereby a connection from a booster chamber 29 to the refill container 30 for the brake circuit II when the valve 15/16 is open. The back enlargement of the closing body 15 of the valve 15/16 is sized to permit the noted connection when the valve 15/16 is open.

A shoulder 31 of the sleeve 17 is arranged to extend from the side of the sleeve 17 and at its free end abuts and is rigidly connected to a push rod 32, which penetrates a parallel bore 33 and whose free end is located opposite a ball closing body 34 of a monitoring check valve 34/35 whose seat 35 is rigidly formed in the housing wall in the bore 33. The check valve 34/35 usually maintains a connection of the brake circuit II with a primary pressure chamber 36 closed.

The primary pressure chamber 36 is bordered by a hydraulic brake piston 37, on whose opposite side is located a secondary chamber 38, which is joined to the multiposition member 5 by means of an exterior brake line 39.

The brake pedal 2 presses against a disc-shaped crossbar 40, whose one side 41 can act upon a slide 43 of an eccentrically arranged brake valve 44 with the interposition of a travel limiting spring 42. A bracket 42' assures that the slide 43 form fits with the crossbar 40 when it returns to its start position. The brake valve 44 usually holds open a connection of a brake line 45 of the brake circuit II with a return flow line 46 and holds closed a connection of the reservoir chamber 47 with the brake line 45. The disc-shaped crossbar 40 is connected with the housing 8 in a sealed fashion by a bellows connection 48. The bellows 48 defines with the piece 40 and housing 8 a fluid chamber 49 which is joined to the return flow line 46. The chamber 49, however, can also be filled with air.

Both the travel limiting spring 42 and a pedal push rod 50 lie in this chamber 49, as does a stop 51, which is formed by a differential piston 52. An annular chamber 53 in the differential piston 52 experiences brake pressure by means of a channel 54 in the housing 8. A monitoring check valve 55 insures thereby, that this pressure is the respective highest brake pressure.

A push rod 56 is arranged at the end of the secondary chamber 38, and a push rod 57 is arranged at the end of the booster chamber 29. These push rods are joined together and cooperate with a switch device 58. The secondary chamber 38 also has a connection with a refill container 59, which is only separated from the refill container 30 by a low separating wall. An additional refill container 60 is formed in the same manner. This refill container 60 insures the pump supply even when one brake circuit fails. All three refill containers 30, 59 and 61 are monitored by a level detector 60. Also connected mechanically to the crossbar 40 is a brake light switch 100.

The pedal push rod 50 is concentrically surrounded by a spring 62, which supports the crossbar 40 opposite the housing 8. An inner end 63 of the pedal push rod 50 usually has a separating space "A" from the booster piston 12, which is equal to or larger than the maximum stroke of the brake pedal push rod when the auxiliary pressure means supply is intact.

Plate springs 22' and 37' lie behind the pistons 22 and 37 respectively; these have the purpose of imparting a small loosening movement to their piston 22 and 37, respectively, during each booster activation.

OPERATION

During normal braking, the pedal force is transferred to the brake valve 44 by means of the travel limiting spring 42 as a path simulator. The brake valve 44 closes the connection of the brake line 45 with the return flow line 46 permitting the application of a brake pressure, that is proportional to the pedal force, to the rear sides of the two pistons 12 and 37 for the brake circuits I and II by means of the multi-position member 5. The pistons 12 and 37 shift and a corresponding brake pressure is developed on the secondary side of these pistons 12 and 37. Therefore, the brake pressure build-up occurs synchronously in both circuits I and II. The two brake circuits I and II are so called closed circuits. Their refilling occurs in brake released condition by the refill container and under certain conditions by means of the multi-position member 5.

If the reservoir pressure in the reservoir 47 fails, the seat 16 approaches the closing body 15, and the engagement of the seat 16 and closing body 15 closes the connection of the booster chamber 29 with a discharge location in the refill container 30. As a result, the entire volume of the chamber 29 is available through the conduit 105, for braking in brake circuit II, and for filling the primary pressure chamber 36 of the brake circuit via bore 33 and check valve 34/35.

The separating distance "A" of the booster piston 12 corresponds to the path of the pedal push rod 50 during maximum brake pressure application. This distance "A" is important for the operation of the locking protection device, because during maximum brake pressure application, for example, during a panic braking on an ice-slick surface, the booster piston 12 must be able to travel back in order to relieve the brakes.

On the other hand, during a failure of the hydraulic energy supply this distance "A" would be the equivalent of a travel loss, which would mean lower brake pressure for this instance. In order to prevent this, when the reservoir pressure supplied through the line 24 fails, the auxiliary piston 22 moves to the right under the force of the reservoir spring 25 and carries the sleeve 17 with it by means of the arm 20. The sleeve 17 moves the booster piston 12 completely to the right by means of the piston rod 14 and spring 13. The booster piston 12 then is nearly in direct contact with pedal push rod 50, and a brake pressure can be produced directly by the pedal 2. This brake pressure is effective for brake pressure production in brake circuit I and also in the primary pressure chamber 36, because the monitoring valve 34/35 is opened by means of the shoulder 31 and push rod 32, thereby producing communication of the chamber 29 with the primary pressure chamber 36.

In order to insure that the brake pedal push rod 50 will not be moved beyond the separating distance "A" even under high pedal forces, the stop 51 is provided as a pedal arresting device. In the embodiment shown in FIG. 1, the annular chamber 53 is filled with the maximum brake pressure by means of the check valve 55, which pressure is enclosed there. If the sleeve 17 then moves to the right because of failing reservoir pressure, then the thereby shifted closing body 34 of the valve 34/35 presses against the check valve 55 by means of a push rod 106, and the pressure in the annular chamber 53 can be relieved, the stop 51 is then no longer effective.

The differential pressure device 58 has the following advantage:

As is well-known, a differential pressure indicator between the two brake circuits I and II is already required by law in several countries, so that a malfunction in the brake system, which is detected by a corresponding differential pressure, is promptly transmitted to the driver. If a leak arises in one brake circuit the piston 37 or 12 reaches the rod 56 or 57 and the pressure device 58 detects the defect.

The two push rods 56 and 57 can, in addition to reporting to the differential pressure device 58, be connected with another corresponding adjusting member, which supplies additional pressure into the chamber 29 and the secondary chamber 38. Such a brake pressure supply can also be necessary for basically intact brake circuits, if, for example, a brake circuit is poorly ventilated or a vapor lock has formed in the system as a result of thermal overloading. A corresponding logical circuit can be provided in the multiple position member 5. In such a case it can be advantageous to empty the reservoir completely and, namely, by means of the multiple position member 5, but only when a speed signal V=O is present, that is, when the vehicle is motionless. In this manner intermediate positions of the booster piston are avoided. It is also possible to allow the brake piston 37 to be shifted by the auxiliary piston 22.

Figure 2:
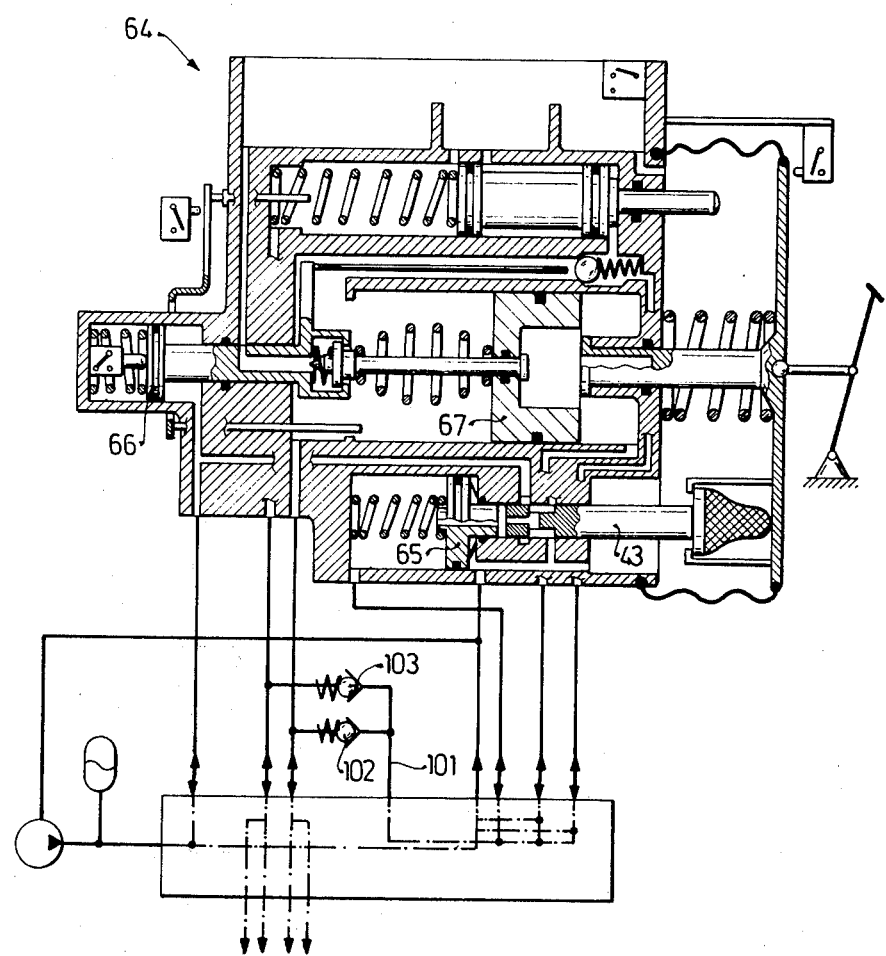
FIG. 2 shows a similar view of a second embodiment of a brake booster.

FIG. 2 shows a different type of brake booster 64. Here there is no stop 51 present. The slide 43 carries a piston 65 at its free end, which piston 65 experiences brake pressure influences on its left side. An auxiliary piston 66 that is similar to the auxiliary piston 22 is arranged along the same axis as the booster piston 67. The method of operation of this brake booster 64 is primarily the same as that of the brake booster 1. A supplementary supply line 101 is provided for a supplementary supply to the two brake circuits, which supplementary supply line 101 is connected to the brake circuits I and II by means of two check valves 102 and 103.

Figure 3:
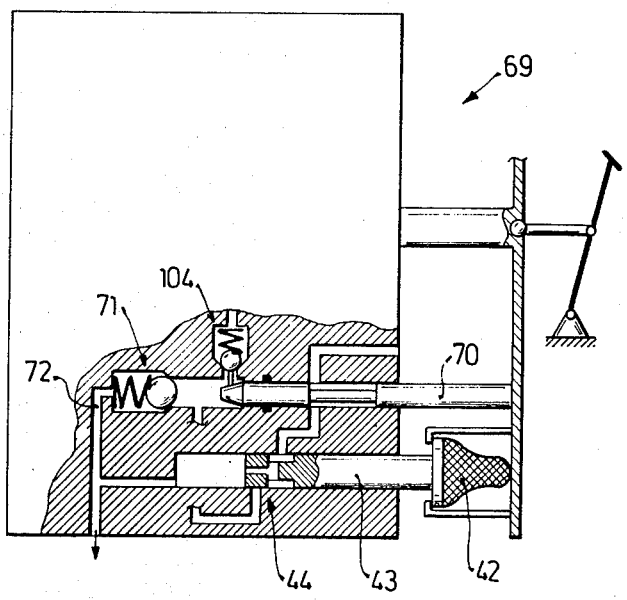
FIG. 3 is a cross-sectional detail view of a device for automatic bypass of a defective brake valve.

With allowance for safety consideration, a device 69 for automatic bypass of a defective brake valve is shown in FIG. 3. If, for example, the slide 43 of the brake valve 44 is hindered in its movement by jamming or by a shaving, it becomes impossible to brake. In order to avoid this an additional push rod 70 is arranged parallel to the slide 43, which additional push rod 70, after traversing the possible pedal travel path allowed by the travel limiting spring 42, first engages an initial valve 104 to reduce leakage losses and then engages a valve 71, which is located in a bypass line 72 for the brake valve 44, so that the latter can then take over in place of the defective brake valve 44 for the application of pressure fluid necessary for braking.

Furthermore, it is also possible in the brake boosters 1 and 64 according to the invention, to provide with simple means, a device to lengthen the pedal travel path during a failure in the auxiliary force. Two such devices are shown in the FIGS. 4 and 5.

Figure 4:
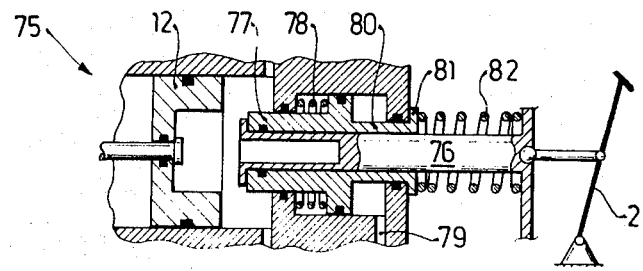
FIG. 4 is a detail view of a device for lengthening the travel path of the pedal.

FIG. 4 shows a device 75, in which a pedal push rod 76 is surrounded by an annular piston 77, which is subjected on one side to the force of a spring 78 and on its other side to the reservoir pressure by means of a line 79. The annular piston 77 has a sleeve extension 80 with a flange 81, against which the push rod 76 presses by means of a spring 82.

Usually the annular piston 77 does not influence the push rod 76. But if the reservoir pressure fails, the annular piston 77 travels to the right and carries the pedal push rod 76 to the right with it by means of the spring 82. In this manner the brake pedal 2 travels into the driver compartment and allows the driver a longer stroke for pedal activation. But a longer pedal travel path means more brake force, whereby the auxiliary force failure can be at least partially compensated for.

Figure 5:
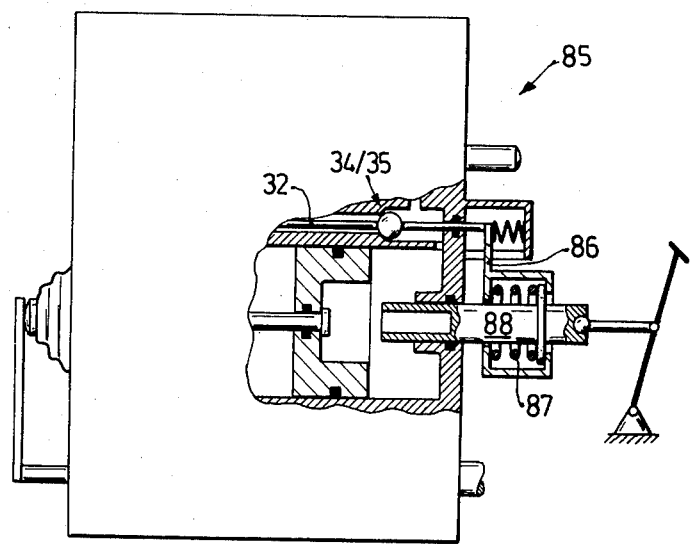
FIG. 5 is a variation on the embodiment of the device according to FIG. 4.

FIG. 5 shows a similar device 85, which is even simpler. The push rod 32 shown in FIG. 1 activates an angle plate 86, by means of the valve 34/35 when the auxiliary force fails, which angle plate 86 engages a pedal push rod 88 by means of a spring 87. This type of device also extends the pedal travel path when the auxiliary force fails.

Figure 6:
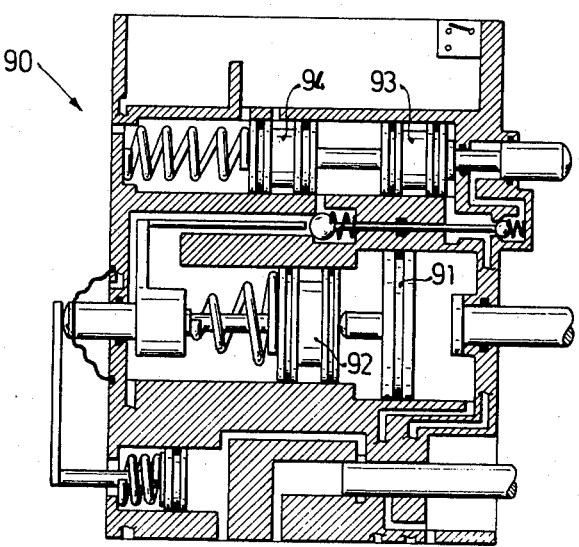
FIG. 6 shows in cross section a further embodiment of a brake booster with pressure transfer.

Finally, FIG. 6 shows a brake booster 90 with pressure transfer. This brake force booster 90 is used in a so-called average pressure system, in which the brake booster force draws its auxiliary energy from a different hydraulic circuit, for example, that of the servo control. In this process the relatively lower pressure in the circuit of the servo control must be transformed into a higher pressure for the brake device, for example, 59 bar to 200 bar. This type of transformation is taken care of by a piston in the brake force booster 90, which piston 91 has a smaller initial booster piston 92. In this exemplary embodiment the main cylinder piston is also divided in two; it consists of two identical pistons 93 and 94. In other aspects this brake booster 90 is of a similar structure to that in FIG. 1, so that further details thereof would be superfluous.

What is claimed is:

1. A brake booster for the anti-wheel locking of a motor vehicle brake system having brake pedal actuation and two hydraulic integral brake circuits, the booster comprising:
   a housing within which a booster cylinder is defined;
   a booster piston mounted for displacement within the booster cylinder;
   a pressure medium supply bore connected to the booster cylinder;
   a pressure medium return bore connected to the booster cylinder, both bores forming part of one of the two brake circuits;
   a control valve mounted to the housing for controlling the pressure medium flow in the supply and return bores;
   connecting means for connection to the brake pedal;
   a travel limiting spring located between the control valve and the connecting means for transmitting brake pedal forces to the control valve;
   a reservoir;
   an auxiliary piston mounted for displacement within the reservoir under the influence of a pressure medium within the reservoir; and
   force transmitting means connecting the booster piston and the auxiliary piston, for displacing the booster piston to a predetermined position which allows the brake pedal to execute an idle stroke relative to the booster piston.

2. The brake booster as defined in claim 1, further comprising:
   a brake pedal push rod connected to said connecting means, wherein the predetermined position defines a separating distance between the booster piston and the brake pedal push rod, which distance is equal to or larger than the maximum stroke of the brake pedal push rod when the reservoir pressure is intact.

3. The brake booster as defined in claim 1, further comprising:
   means forming a connection between the two brake circuits;
   a monitoring valve located to normally close the connection between the two brake circuits;
   a push rod connected to the force transmitting means and located to open the monitoring valve thereby establishing a connection between the two brake circuits when the reservoir pressure fails.

4. The brake booster as defined in claim 1, further comprising:
   pressure indicating means for indicating the pressure in the reservoir, said pressure indicating means being actuated by the force transmitting means.

5. The brake booster as defined in claim 1, further comprising:
   stop means located in the path of travel of the connecting means, said stop means being mounted for displacement in the direction of travel of the connecting means when the reservoir pressure fails.

6. The brake booster as defined in claim 5, further comprising:
   a further monitoring valve;
   a pressure chamber controlled by the further monitoring valve; and
   actuating means for opening the further monitoring valve when the reservoir pressure fails, wherein the stop means is formed as a differential piston, one surface of which is subject to the pressure in the pressure chamber.

7. The brake booster as defined in claim 6, wherein the actuating means is coupled with said monitoring valve.

8. The brake booster as defined in claim 1, wherein the housing further defines a main cylinder and a control valve cylinder, and wherein said booster cylinder, said main cylinder and said control valve cylinder are arranged in parallel.

9. The brake booster as defined in claim 8, further comprising:
   a main cylinder brake piston mounted for displacement within the main cylinder; and
   switch means for sensing the position of the booster piston and the main cylinder brake piston, wherein the booster piston forms part of one brake circuit, and the main cylinder brake piston forms part of the other brake circuit.

10. The brake booster as defined in claim 9, wherein the signal generated by the switch means is indicative of a low pressure condition in the booster cylinder and main cylinder.

11. The brake booster as defined in claim 9, wherein the signal generated by the switch means is indicative of a differential pressure condition between the booster cylinder and the main cylinder.

12. The brake booster as defined in claim 1, further comprising:
   a reservoir spring mounted for biasing the auxiliary piston against the pressure in the reservoir; and
   pressure indicating means for indicating the pressure in the reservoir, said pressure indicating means being actuated by the force transmitting means.

13. The brake booster as defined in claim 1, further comprising:
   a safety device including a bypass line formed in the housing and valve means connected to the connecting means by means of which a direct connection is established between the booster cylinder and a pressure source through the bypass line when the control valve fails.

14. The brake booster as defined in claim 13, wherein the safety device has an initial valve provided to reduce leakage loses.

15. The brake booster as defined in claim 13, wherein the safety device and the control valve are arranged in parallel, and wherein the safety device opens the bypass line when the control valve and travel limiting spring are pressed together.

16. The brake booster as defined in claim 1, further comprising:
   a spring loaded member exposed to the pressure in the reservoir and adjustable by variations thereto for extending the travel path of brake pedal when a pressure failure in the reservoir occurs.

17. The brake booster as defined in claim 16 further comprising:
   a brake pedal push rod connected to said connecting means, wherein the spring loaded member includes an annular piston mounted on the brake pedal push rod.

18. The brake booster as defined in claim 16, further comprising:
a brake pedal push rod connected to said connecting means, wherein the spring loaded member includes an angle plate mounted to the brake pedal push rod, and a valve which engages the angle plate.

19. The brake booster as defined in claim 1, wherein the force transmitting means includes part of a discharge line and a valve located between the booster piston and the auxiliary piston for closing the discharge line when the reservoir pressure fails.

20. The brake booster as defined in claim 19, wherein the force transmitting means further includes an arm and a biasing spring, wherein the valve of the force transmitting means includes a valve seat defining portion and a closing body, wherein the auxiliary piston acts on the valve seat defining means with said arm, and wherein the closing body is carried by the booster piston and is spaced in the axial direction by the biasing spring.

21. The brake booster as defined in claim 1, wherein the booster piston comprises two separate elements, one a low pressure element and the other a high pressure element which are axially aligned with respect to each other.

22. The brake booster as defined in claim 1, further comprising:
a folding bellows connected to the housing, wherein the housing further defines a main cylinder and a control valve cylinder, wherein the booster cylinder, the main cylinder and the control valve cylinder are arranged in parallel, wherein the connecting means comprises a disc-shaped crossbar connected to the folding bellows, said housing, folding bellows and crossbar defining a chamber.

23. The brake booster as defined in claim 22, wherein the chamber defined by the housing, the folding bellows and the crossbar has pressure medium flowing through it from one of the brake circuits.

24. The brake booster as defined in claim 1, further comprising:
a stop light switch mounted to the housing and engageable by the connecting means.

25. The brake booster as defined in claim 1, further comprising:
a form fitting connection mounted to the connecting means and engageable with the control valve when the brake pedal is at rest.

26. The brake booster as defined in claim 1, further comprising:
a main cylinder formed in said housing; and
a main cylinder brake piston mounted for displacement within the main cylinder, wherein the booster piston and main cylinder brake piston have approximately the same effective pressure surfaces.

27. The brake booster as defined in claim 1, further comprising:
separate supply containers for the brake circuits and the pump circulation.

28. In combination, a multi-position member, a pressure medium source connected to the multi-position member, and a brake booster connected to the multi-position member, said combination serving as the anti-wheel locking apparatus of a motor vehicle brake system, the brake booster comprising:
a housing within which a booster cylinder is defined;
a booster piston mounted for displacement within the booster cylinder;
a pressure medium supply bore connected to the booster cylinder;
a pressure medium return bore connected to the booster cylinder, both bores forming part of one of the two brake circuits;
a control valve mounted to the housing for controlling the pressure medium flow in the supply and return bores;
connecting means for connection to the brake pedal;
a travel limiting spring located between the control valve and the connecting means for transmitting brake pedal forces to the control valve;
a reservoir;
an auxiliary piston mounted for displacement within the reservoir under the influence of a pressure medium within the reservoir; and
force transmitting means connecting the booster piston and the auxiliary piston, for displacing the booster piston to a predetermined position which allows the brake pedal to execute an idle stroke relative to the booster piston.

29. The combination as defined in claim 28, wherein the pressure medium source can be emptied by the multi-position member when the vehicle brakes are not applied.

30. The combination as defined in claim 28, wherein the pressure medium source can be emptied by the multi-position member when the vehicle is motionless.

31. The combination as defined in claim 28, further including a supplementary pressure medium supply line connected to the multi-position member and two check valves, by means of which both brake circuits can be supplemented.

* * * * *